United States Patent Office 3,346,870
Patented Oct. 10, 1967

3,346,870
RECORDER
Witold Krynicki, 148 N. Sierra Bonita, Pasadena, Calif. 91106, and Francis E. Lehner, 145 Mauna Loa Drive, Monrovia, Calif. 91016
Filed Oct. 22, 1965, Ser. No. 502,034
12 Claims. (Cl. 346—109)

This invention relates to recorders, such as recorders for seismograph signals.

Seismographs and like instruments are frequently left in remote places to which access is tiresome or difficult. It is therefore desirable that devices be provided for recording signal at the site which need not be serviced for extended periods of time. For example, the device which is the subject of this invention needs to be serviced only every sixty days or so.

Because devices of the type referred to herein are intended to be checked over and resupplied so infrequently, they obviously need to be inherently rugged and reliable. Attempts have previously been made to fill the requirements of reliability and long service intervals, but the prior art devices have ordinarily involved too many moving parts whose relative alignments are critical. Because many instruments of this type use amplified signals from pickups which are converted in turn to small angle movements of galvanometer mirrors, manufacturing tolerance errors alone have frequently been sufficient to deprive much potentially useful data of its value, and to render its acquisition unduly difficult.

It is an object of this invention to provide a recorder in which all signal-sensitive components can remain stationary (except for the pivoting of the mirror, and in which all motions needed for providing a time base for the signals can be provided in a simple, in-line and inherently rugged construction.

A photographic recording device according to this invention has a central axis along which an input image will be received for the purpose of recording the same. The device includes a base, and a cylindrical recording surface stationary relative to this base which comprises a surface of revolution generated around this axis. A table is rotatably mounted to the base for rotation about this axis as a center. A deflection mirror is mounted to the table so as to rotate therewith. This mirror intersects the axis at an angle thereto, whereby to deflect an axially-directed image laterally toward the recording surface.

A prism mount is rotatably mounted to the base and is adapted to rotate about the said axis as a center. A dove prism which is held by said prism mount for rotation therewith extends along the said axis. The dove prism has the property of rotating an image which impinges thereon through an angle twice that of its own rotation. On the other hand, the deflection mirror has the property of rotating an image impinging thereon through an angle equal only to that of its own rotation. Drive means drives the table at a first angular velocity, and the prism mount at a second angular velocity, the second velocity being half that of the first. With this arrangement, an image which is upright on the recording surface at one angular position of the table remains upright on the recording surface at all other angular positions of the table, and the time base is provided by relatively rotatable, ruggedly interconnected and easily manufactured and aligned components.

According to a preferred but optional feature of the invention, film supply means is provided for placing a supply of photographic film at the recording surface for recording the said image thereon, together with means for replacing the said supply from time to time.

According to still another preferred but optional feature of the invention, displacement means is provided on the table for displacing the image reflected from the deflection mirror along the recording surface in an axial direction.

The above and other features of this invention will be fully understood from the following detailed description and the accompanying drawings in which.

Figure 2:
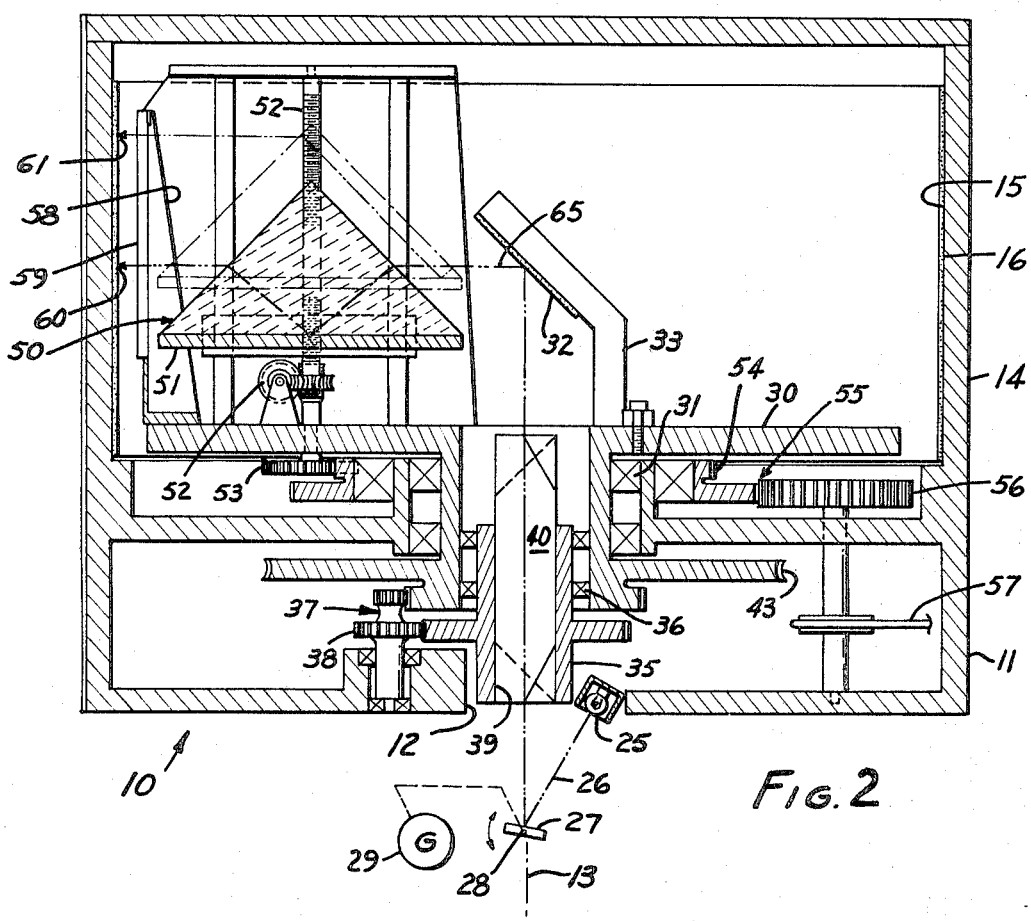
FIG. 2 is a fragmentary cross-section taken at line 2—2 of FIG. 1.

The presently preferred embodiment of photographic recording device 10 is shown in the figures. With particular reference to FIG. 2, there is shown a base 11 having a port 12 which is open at a medial portion of a plate at the bottom of the base. The device has a central axis 13 which passes through this port. The base includes a circular wall 14 which defines a cylindrical recording surface 15 on the inside thereof. This surface is a surface of revolution generated by a straight-line generator centered on axis 13.

Figure 1:
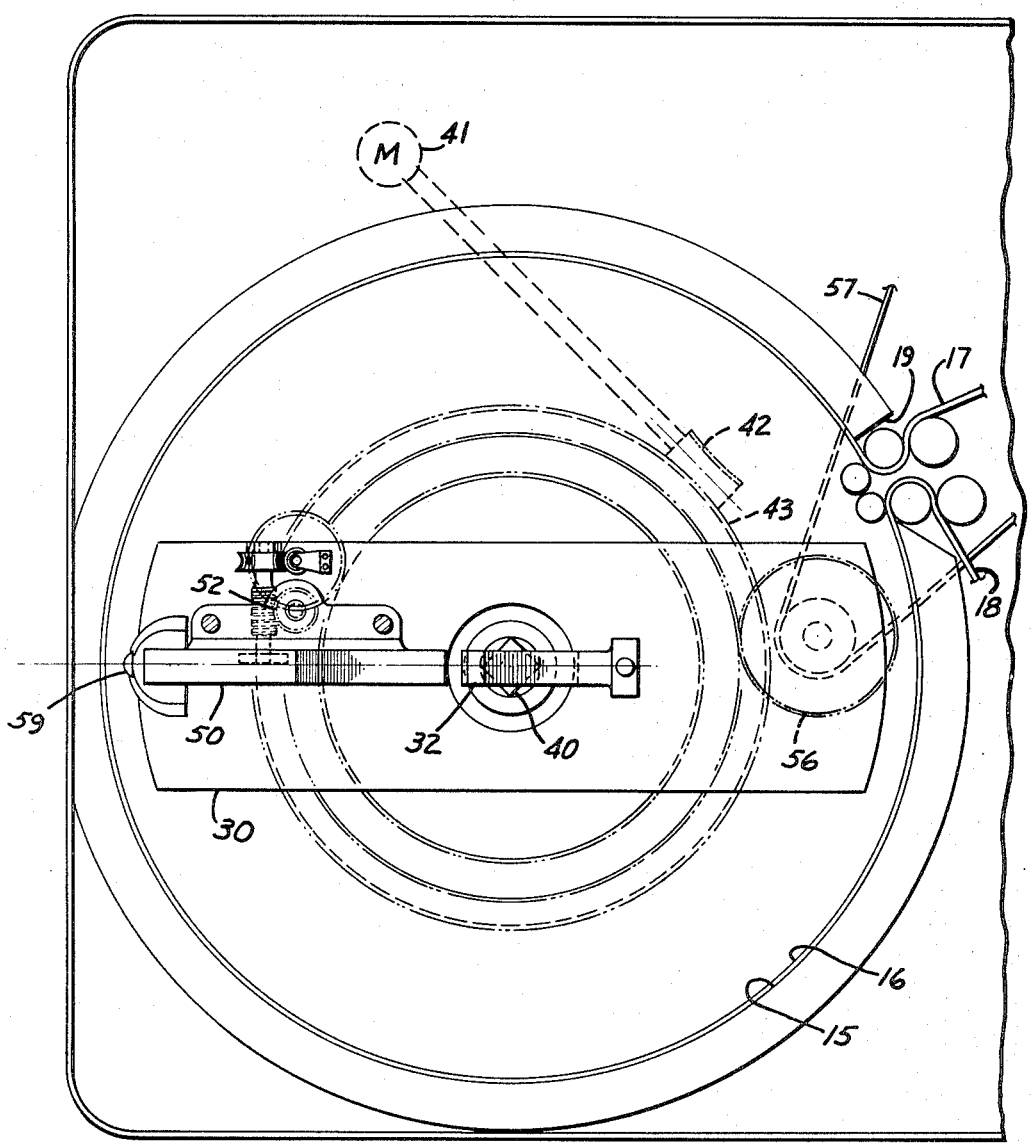
FIG. 1 is a top view of the presently preferred embodiment of the invention.

As best shown in FIG. 1, photographic film 16 is pressed against surface 15, which surface provides the film with a cylindrical shape. The film may be changed by supplying it from a supply end 17 and taking it up at a take-up end 18, and clamping the same as desired. The film enters and leaves through a slot 19 in the side, which slot takes up a minor portion of the total periphery of the wall.

The base and the recording surface are stationary and do not rotate. In order to provide a trace thereon, it is therefore necessary to rotate the image derived from the signal. The presently preferred embodiment of the invention will produce, over a given period of time such as one or two days, a record 20 (FIG. 3) which includes a plurality of spiral traces 21. These spiral traces are in reality continuous, but they are broken at ends 22, 23, where the film passes through the slot. Stepper means (not shown) may be provided to step past the gap on the wall should this be considered desirable. However, the time lost in the passage of the image over this portion of the trace may be made so small that the risk of loss of data is insignificant.

Figure 3:
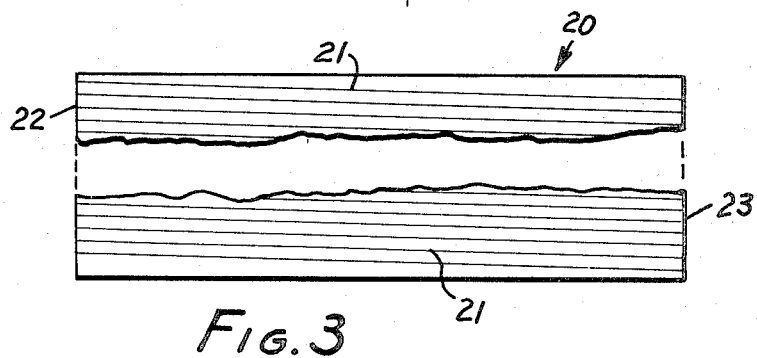
FIG. 3 is a fragmentary view of a portion of FIG. 2.

The illustration of FIG. 3 shows a situation where there has been no signal input. Had there been a signal input at any time, the particular trace would have shown differences from the traces illustrated in an upward and downward direction characteristic of traces of charts of this type.

A light source 25 may conveniently be mounted to the base to provide a ray 26 whose direction is invariable. The term "ray" is, of course, synonymous with the term "beam of light." This ray impinges upon a galvanometer mirror 27 which is pivotally mounted to the base so as to be swingable about an axis 28 normal to the plane of FIG. 2 and to axis 13. A galvanometer 29 includes a pivoted coil to which the mirror is attached, the rotation of which coil is reproduced by rotation of the mirror so as to deflect ray 26 in a direction and an amount proportional to the signal impressed on the galvanometer, the signal causing the coil to pivot in a magnetic field. The nominal direction of the reflected ray 26 at zero input signal is along central axis 13. Rotation of the mirror will deflect ray 26 through an angle which is proportional to the input signal, and it is this deflection which is to be recorded.

The device includes a table 30 which is rotatably mounted to the base by means of bearings 31. A deflection mirror 32 is mounted to the table by a stand 33. Mirror 32 is preferably disposed at a 45° angle to the central axis and intersects the same. As the table rotates, so does the deflection mirror. Then an axial ray reaching the recording surface would describe a circle on the recording surface unless means were provided to shift the beam axially.

Because a signal derived from mirror 27 will be rotated 360° for every rotation of the deflection mirror, it is obvious that there is only one position in which the correct recording could be obtained without intermediate means to compensate for this rotation. It is therefore necessary to provide means to maintain the image in an upright position, and this is accomplished by means of a prism mount 35 which is rotatably mounted to the table through bearings 36, and thence mounted rotatably relative to the base.

Drive means 37 includes a gear train 38 which interconnects the table and the prism mount and has gear ratios relative to both, such that the prism mount rotates at half the rate of the table. The prism mount has a central axial passage 39 within which is mounted a conventional dove prism 40. The dove prism has the function of rotating an image impinging thereon through twice the angle of its own rotation. The resulting effect of rotation of the deflection mirror and the dove prism is to maintain erect on the recording surface an image derived from ray 26 through galvanometer mirror 27.

Motor 41 (FIG. 1) driving through worm gear 42 and spur gear 43 drives the table and the gear train.

It is evident that the construction described thus far will cause only one circular trace in a single plane which lines normal to the axis and to the plane of FIG. 2. It is therefore necessary periodically to step the trace axially so as either to provide a plurality of such traces which lie parallel to each other, or to achieve a spiral arrangement. Either arrangement is possible with this device depending upon how it is operated. A preferred operation provides the spiral trace shown in FIG. 3. This is preferable to a stepwise action, because this is a more continuous form of operation and does not require means for intermittent action. In either event there will be provided for the purpose of displacing the trace axially, a prism 50 which is mounted to a mounting block 51 that is in turn engaged by lead screw 52. The lead screw includes a gear 53 that is engaged by gear 54 that proceeds through an additional gear train 55 to a belt-driven gear 56 (FIG. 2). Belt 57 is driven by a motor (not shown). If belt 57 is driven intermittently, then parallel horizontal traces will be provided on the record. If it is driven constantly, then spiral traces will be obtained which slant on the record as in FIG. 3. A guide 58 keeps the prism aligned, and a lens 59, which is preferably plano-convex and extended in the vertical direction, focuses the beam on the recording surface.

It will be seen that the driving of gear 56 causes rotation of the lead screw and that this tends to elevate the prism. In solid line, the prism is shown in a first position where the trace of the ray results in impingement on the recording surface at point 60. The prism is shown in a second condition in dashed line where the rays impinge on the recording surface at point 61. Intermediate prism positions cause impingement at intermediate points.

The operation of the device should be evident from the foregoing. A fresh supply of photographic film is provided by pulling the film through the device so as to supply an adequate amount length of film, and then pressing the film against the recording surface by means not shown. This can be accomplished at any desired time. While this resupply is being accomplished, the prism is lowered to its bottom position as shown in solid line in FIG. 2. Then motor 57 is again either operated intermittently or continuously, and motor 41 is turned on for continuous operation. The galvanometer trace will pass through the dove prism where it is rotated through an angle and in a direction such as to compensate for the rotation caused by the deflection mirror. The trace of ray 65 as derived from the deflection mirror strikes prism 50 where it undergoes internal total reflection as conventional in prisms of the class illustrated, and strikes the recording surface, where it is recorded as data.

Angular motion of the galvanometer mirror is of course recorded at the recording surface in this manner. As the prism moves upwardly, so does the point of impingement, and, as stated heretofore, this may be an intermittent or a constant motion. In either event, an image, once upright at some position of the table, will remain always upright at any position of the table due to the interrelationship of the dove prism and the reflection mirror and their differential rates of rotation.

The construction as shown consists of standard, rugged watch-type gearing, which is readily held to very close tolerances and all of which is concentric. No portion of the galvanometer itself need be rotated around axis 13, so that the galvanometer and its light source can be mounted on a solid base, and thereby be rendered free of the problem of slip rings, angular tolerances and the like. The device is readily serviced and sufficiently rugged to stand up under long periods of no service.

This invention is not to be limited by the embodiment shown in the drawings and described in the description which is given by way of example and not of limitation, but only in accordance with the scope of the appended claims.

We claim:

1. A photographic recording device having a central axis, and adapted to receive a substantially axially-directed image for the purpose of recording the same, comprising: a base; a cylindrical recording surface on said base comprising a surface of revolution generated around said axis; a table rotatably mounted to said base for rotation about said axis as a center; a deflection mirror mounted to said table and intersecting the axis at an angle thereto, whereby to deflect an axially-directed image laterally toward the recording surface; a prism mount rotatably mounted to the base and adapted to rotate about said axis as a center; a dove prism held by said prism mount for rotation therewith, the said axis intersecting the dove prism; drive means driving the table at a first angular velocity, and also driving the prism mount at a second angular velocity, the second angular velocity being half that of the first angular velocity, whereby because the dove prism has the property of rotating an image impinging thereon through an angle twice that of its own rotation, and because the deflection mirror has the property of rotating an image impinging thereon through an angle equal to that of its own rotation, an image which is upright on the reference surface at one angular position of the table remains upright on the recording surface at all other angular positions of the table.

2. A recording device according to claim 1 in which film-supply means is provided for placing a supply of photographic film at the recording surface for recording the said image thereon.

3. A recording device according to claim 1 in which displacement means is provided on the table for displacing an image reflected from the deflection mirror along the recording surface in an axial direction.

4. A recording device according to claim 3 in which said displacement means comprises a prism, a mounting block supporting the prism, and block drive means adapted to shift the block and the prism axially relative to the said deflection mirror.

5. A recording device according to claim 1 in which the drive means includes a gear train interconnecting the table and the prism mount.

6. A recording device according to claim 1 in which the block drive means includes a lead screw which is drivingly engaged to the mounting block, and in which a track is attached to the table for guiding the prism as it is moved by the lead screw.

7. In combination: a galvanometer; a galvanometer mirror whose angular position is determined by the galvanometer in response to a signal impressed thereon; a light source impinging on said galvanometer mirror; and a photographic recording device having a central axis, and adapted to receive a substantially axially-directed image from the galvanometer for the purpose of recording the same, said device comprising: a base; a cylindrical recording surface on said base comprising a surface of revolution generated around said axis; a table rotatably mounted to said base for rotation about said axis as a center; a deflection mirror mounted to said table and intersecting the axis at an angle thereto, whereby to deflect an axially-directed image laterally toward the recording surface; a prism mount rotatably mounted to the base and adapted to rotate about said axis as a center; a dove prism held by said prism mount for rotation therewith, the said axis intersecting the dove prism; drive means driving the table at a first angular velocity, and also driving the prism mount at a second angular velocity, the second angular velocity being half that of the first angular velocity, whereby, because the dove prism has the property of rotating an image impinging thereon through an angle twice that of its own rotation, and because the deflection mirror has the property of rotating an image impinging thereon through an angle equal to that of its own rotation, an image which is upright on the recording surface at one angular position of the table remains upright on the recording surface at all other angular positions of the table.

8. A recording device according to claim 7 in which film-supply means is provided for placing a supply of photographic film at the recording surface for recording the said image thereon.

9. A recording device according to claim 7 in which displacement means is provided on the table for displacing an image reflected from the deflection mirror along the recording surface in an axial direction.

10. A recording device according to claim 9 in which said displacement means comprises a prism, a mounting block supporting the prism, and block drive means adapted to shift the block and the prism axially relative to the said deflection mirror.

11. A recording device according to claim 7 in which the drive means includes a gear train interconnecting the table and the prism mount.

12. A recording device according to claim 7 in which the block drive means includes a lead screw which is drivingly engaged to the mounting block, and in which a track is attached to the table for guiding the prism as it is moved by the lead screw.

No references cited.

RICHARD B. WILKINSON, *Primary Examiner.*

MICHAEL LORCH, *Examiner.*